US007288733B2

(12) United States Patent
Yamada et al.

(10) Patent No.: US 7,288,733 B2
(45) Date of Patent: Oct. 30, 2007

(54) KEYBOARD APPARATUS

(75) Inventors: Shigeru Yamada, Gunma (JP); Toshimi Chiba, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/546,312

(22) Filed: Oct. 12, 2006

(65) Prior Publication Data

US 2007/0125626 A1 Jun. 7, 2007

(30) Foreign Application Priority Data

Dec. 2, 2005 (JP) ............................. 2005-349425

(51) Int. Cl.
*G06F 1/20* (2006.01)

(52) U.S. Cl. ...................... 200/5 A; 200/517; 200/344; 361/687

(58) Field of Classification Search ................ 200/5 A, 200/517, 344, 345; 341/22; 345/168, 169; 361/680, 683, 686–690, 698, 699, 720
See application file for complete search history.

(56) References Cited

U.S. PATENT DOCUMENTS

| | | | | |
|---|---|---|---|---|
| 5,313,362 | A * | 5/1994 | Hatada et al. | 361/709 |
| 5,757,615 | A * | 5/1998 | Donahoe et al. | 361/687 |
| 6,130,388 | A * | 10/2000 | Nishijima | 200/293 |
| 6,674,642 | B1 * | 1/2004 | Chu et al. | 361/687 |
| 6,795,312 | B2 * | 9/2004 | Narakino et al. | 361/687 |
| 6,909,602 | B2 * | 6/2005 | Dietrich et al. | 361/687 |
| 6,935,412 | B2 * | 8/2005 | Mueller | 165/80.4 |
| 6,992,382 | B2 * | 1/2006 | Chrysler et al. | 257/717 |

FOREIGN PATENT DOCUMENTS

| | | |
|---|---|---|
| JP | 11316647 | 11/1999 |

* cited by examiner

*Primary Examiner*—Michael A Friedhofer
(74) *Attorney, Agent, or Firm*—Venable, LLP; James R. Burdett

(57) ABSTRACT

A keyboard apparatus has a base component arranged under key switches. The base component has an embossed portion. A cooling material is filled into the embossed portion. The embossed portion may be formed continuously between the key switches along the length of key rows over substantially the entire length from the left end to the right end of the rows. On the base component, a membrane sheet having contact point portions corresponding to the key switches may be arranged. The membrane sheet may have a heat dissipation hole at a part opposing the embossed portion.

8 Claims, 6 Drawing Sheets

KEYBOARD APPARATUS

CROSS-REFERENCE TO RELATED APPLICATION

This application claims priority under 35 USC 119 from Japanese Patent Application No. 2005-349425, the disclosure of which is incorporated by reference herein.

BACKGROUND OF THE INVENTION

1. Field of the Invention

The present invention relates to a keyboard apparatus equipped with a plurality of key switches, and more specifically to a keyboard apparatus having improved strength and heat radiation performance.

2. Description of the Related Art

Keyboard apparatuses have been widely used conventionally as input devices of computers. Further in recent years, along with the spread of notebook personal computers, the notebook personal computers have become thinner and more lightweight, and accordingly, there is a demand for a thin and lightweight keyboard to configure the notebook personal computers.

The thin structure of a keyboard accompanies the thin structure of parts configuring the keyboard. For example, by making a back plate configuring the keyboard thin, the keyboard can be made thin. As another method for making the thin structure, there is for example one disclosed in Japanese Patent Application Laid-Open (JP-A) No. 11-316647. The method for making the thin structure disclosed therein is a method wherein the height of key switches opposing the display screen on the lid body of a notebook computer are not changed specially, but only key switches opposing the circumferential portion of the display screen are formed low so that the thickness of the computer should become thin when the lid body is closed.

When the structural parts of the keyboard are made thin, the strength of the parts decreases. For example, when the back plate is made thin as described above, the strength of the back plate decreases. Further, when a notebook personal computer is made thin, overcrowding of parts occurs, and the heat generation amount from a CPU and the like increases, which has been a problem in the prior art.

SUMMARY OF THE INVENTION

The present invention has been made in view of the above circumstances and provides a keyboard apparatus.

According to a first aspect of the invention, there is provided a keyboard apparatus comprising a base component on which a plurality of key switches are arranged, and which has an embossed portion, wherein the inside of the embossed portion is filled with a cooling agent.

BRIEF DESCRIPTION OF THE DRAWINGS

Preferred embodiments of the present invention will be described in detail based on the following figures, wherein.

DETAILED DESCRIPTION OF THE INVENTION

Figure 1:
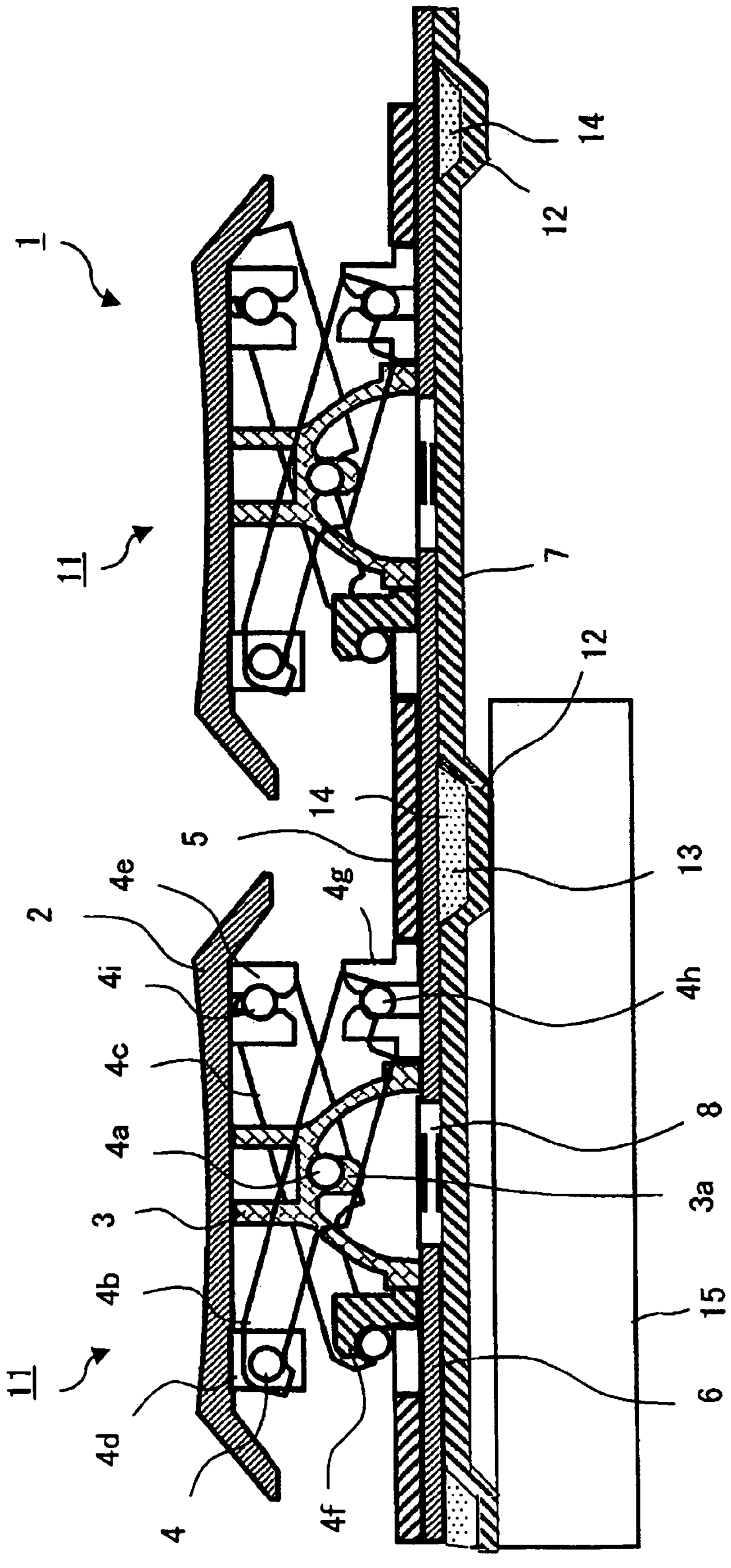
FIG. 1 is a cross sectional view showing a keyboard apparatus according to a first embodiment.
Figure 2A:
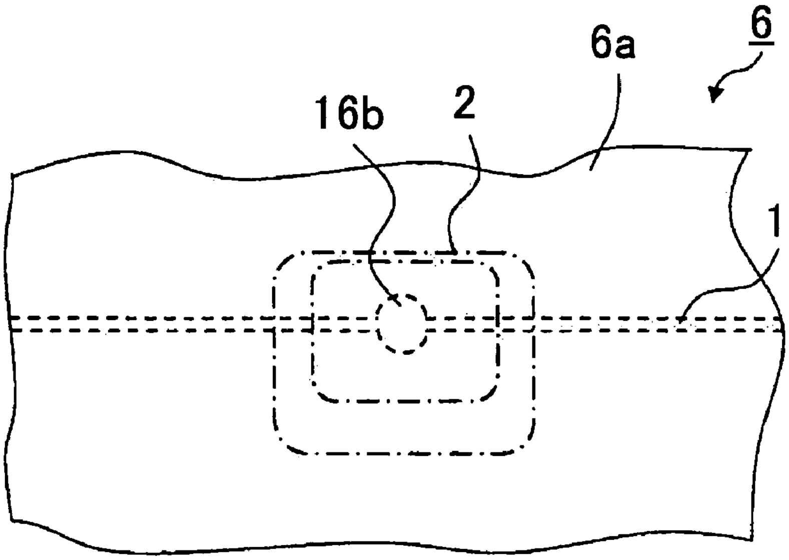
FIGS. 2A-2C are disassembled views showing a membrane sheet according to the first embodiment.
Figure 2B:
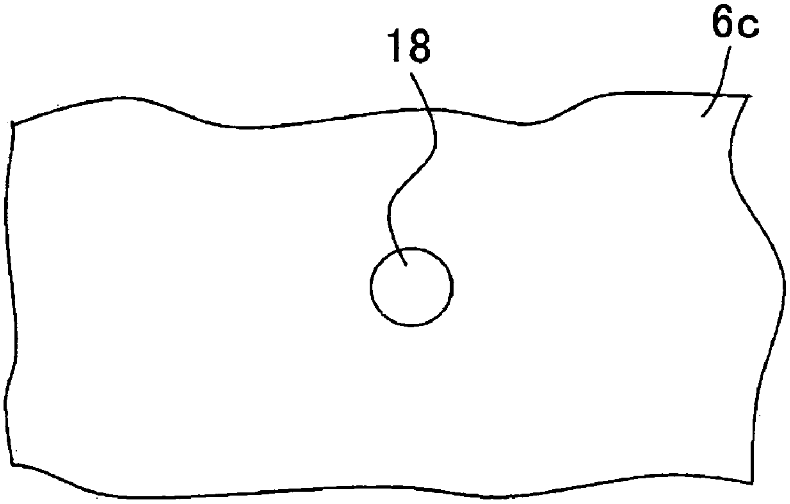
Figure 2C:
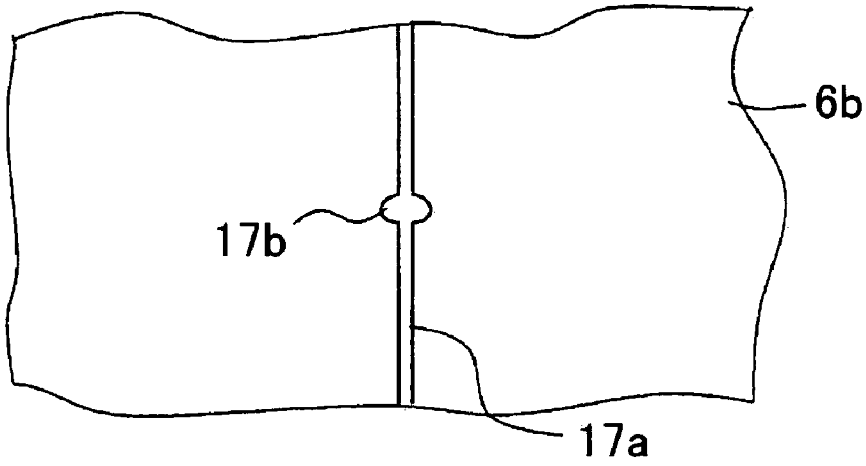
Figure 3:
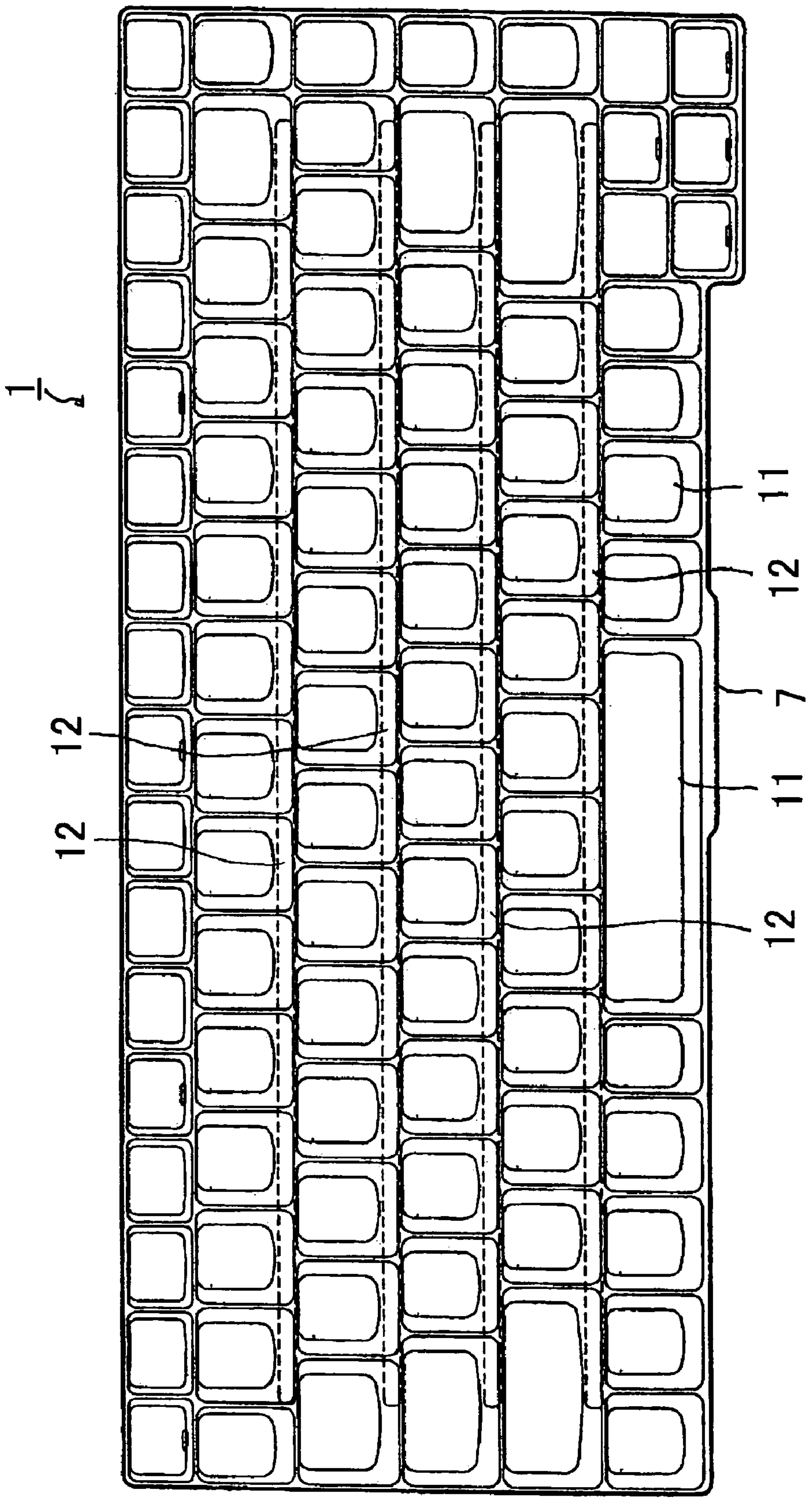
FIG. 3 is a plan view showing the keyboard apparatus according to the first embodiment.

Embodiments according to the present invention are illustrated in more details with reference to the attached drawings hereinafter. Meanwhile, in all the drawings, an identical code is allotted to the same component. FIG. 1 is a cross sectional view showing a keyboard apparatus according to a first embodiment, FIGS. 2A-2C are disassembled views showing a membrane sheet according to the first embodiment, and FIG. 3 is a plan view showing the keyboard apparatus according to the first embodiment.

Although two key switches are shown in FIG. 1, the structure thereof is the same, and thus one key switch is explained. A key switch 11 in a keyboard apparatus 1 according to the first embodiment is equipped with a key top 2, a cup rubber 3, a link mechanism 4, a housing 5, a membrane sheet 6 and a reinforcing plate (base component) 7.

The link mechanism 4 is composed of link components 4*b*, 4*c* arranged swingably in an X shape viewed from the side by a spindle 4*a*, holders 4*d*, 4*e* formed on the undersurface of the key top 2, and holders 4*f*, 4*g* formed on the housing 5. The link component 4*b* and the link component 4*c* rotate around supporting points 4*h*, 4*i*, respectively, and thereby the key top 2 moves upward and downward. When the key top 2 is pressed down from above, the cup rubber 3 buckles, and a protruded portion 3*a* formed on the bottom of the cup rubber 3 presses down a contact point portion 8 formed in the membrane sheet 6, thereby obtaining electric conduction.

Under the housing 5, the membrane sheet 6 is arranged. In FIGS. 2A-2C, the membrane sheet 6 is made of three PET sheets of an upper sheet 6*a*, a lower sheet 6*b* and a spacer sheet 6*c*, and has a structure wherein the spacer sheet 6*c* is sandwiched between the upper sheet 6*a* and the lower sheet 6*b*. On the surface of the upper sheet 6*a* opposing the spacer sheet 6*c*, a pattern portion 16*a* of conductive ink such as Ag ink is formed, and at the position of the pattern portion 16*a* opposing the key switch 11, a contact point 16*b* is formed. Meanwhile, the position of the key top 2 is shown in a two-dot chain line over the upper sheet 6*a*.

Further, on the surface of the lower sheet 6*b* opposing the spacer sheet 6*c*, a pattern portion 17*a* of Ag ink is formed in the same manner, and at the position of the pattern portion 17*a* opposing the key switch 11, a contact point 17*b* is formed. Further, in the spacer sheet 6*c*, a spacer hole 18 is formed in the position opposing both the contact points 16*b*, 17*b*. The contact point 16*b* of the upper sheet 6*a* and the contact point 17*b* of the lower sheet 6*b* can contact each other via the spacer hole 18, and these points configure the contact point portion 8. By arbitrarily setting the diameter of the spacer hole 18 and the thickness of the spacer sheet 6*c*, it is possible to obtain a contact point action load arbitrarily.

In FIG. 1, in the reinforcing plate 7 arranged under the membrane sheet 6, an embossed portion 12 is formed between the key switches 11. The embossed portion 12, as shown in a dot line in FIG. 3, is formed continuously over the entire area from the left end to the right end along key rows between plural key rows of the keyboard apparatus 1. A space portion 13 formed above the embossed portion 12 is filled with a cooling agent 14. The cooling agent 14 is filled continuously without clearance in the space portion 13. The upper portion of the cooling agent 14 is covered with the membrane sheet 6.

In the keyboard apparatus 1 according to the first embodiment structured as above, as shown in FIG. 1, when a heat source 15 such as a CPU is arranged under the reinforcing plate 7, heat from the heat source 15 is absorbed by the cooling agent 14 via the embossed portion 12 of the reinforcing plate 7, and thereby it is possible to prevent the apparatus 1 from overheating. Further, the embossed portion 12 is formed in the reinforcing plate 7, thereby the strength of the reinforcing plate 7 itself increases, and accordingly the strength of the keyboard apparatus 1 increases, too.

The arrangement of the embossed portion 12 and the cooling agent 14 does not cause any influence upon the original actions of the keyboard apparatus 1. Consequently, according to the first embodiment, it is possible to maintain the original functions of the keyboard apparatus 1, and also secure the strength thereof when made thin and attain the cooling effect thereof.

Figure 4:
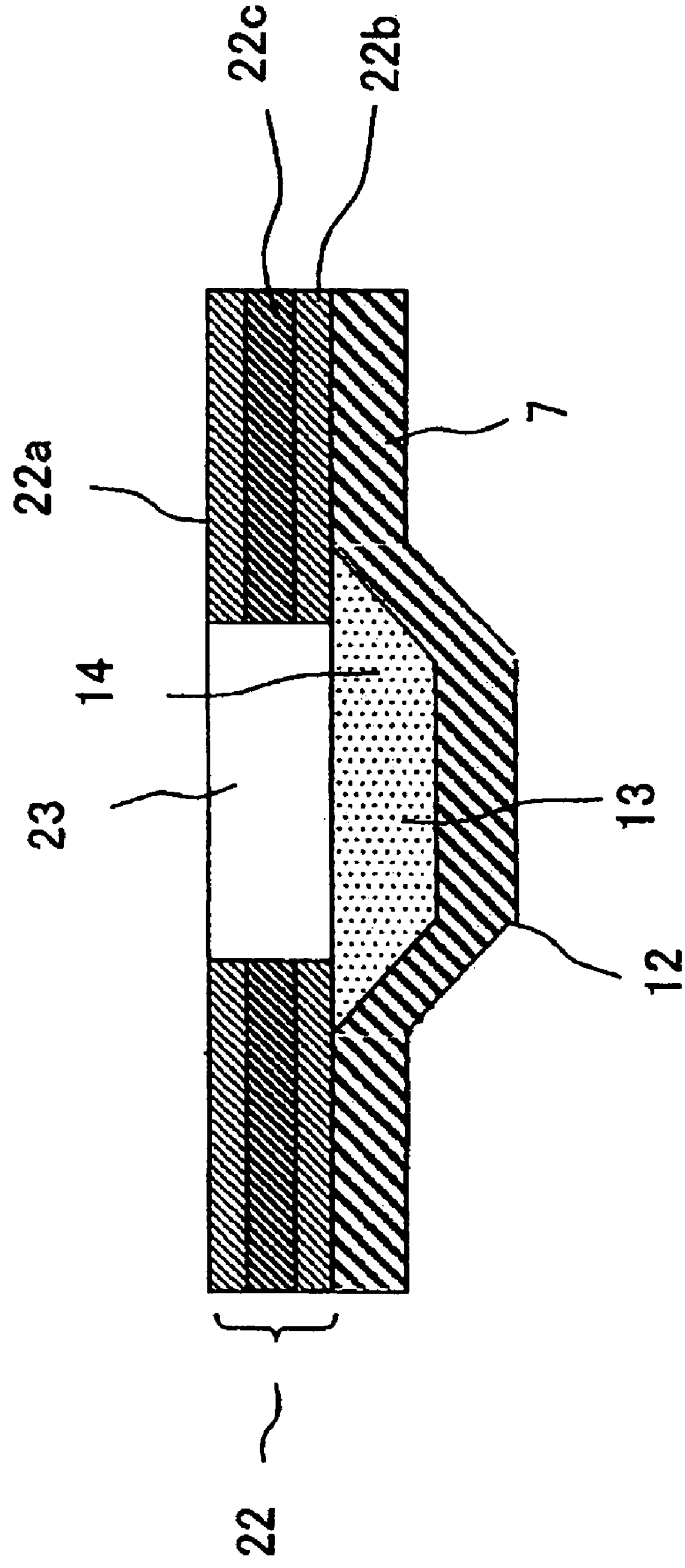
FIG. 4 is a cross sectional view showing the substantial portion of a keyboard apparatus according to a second embodiment.
Figure 5:
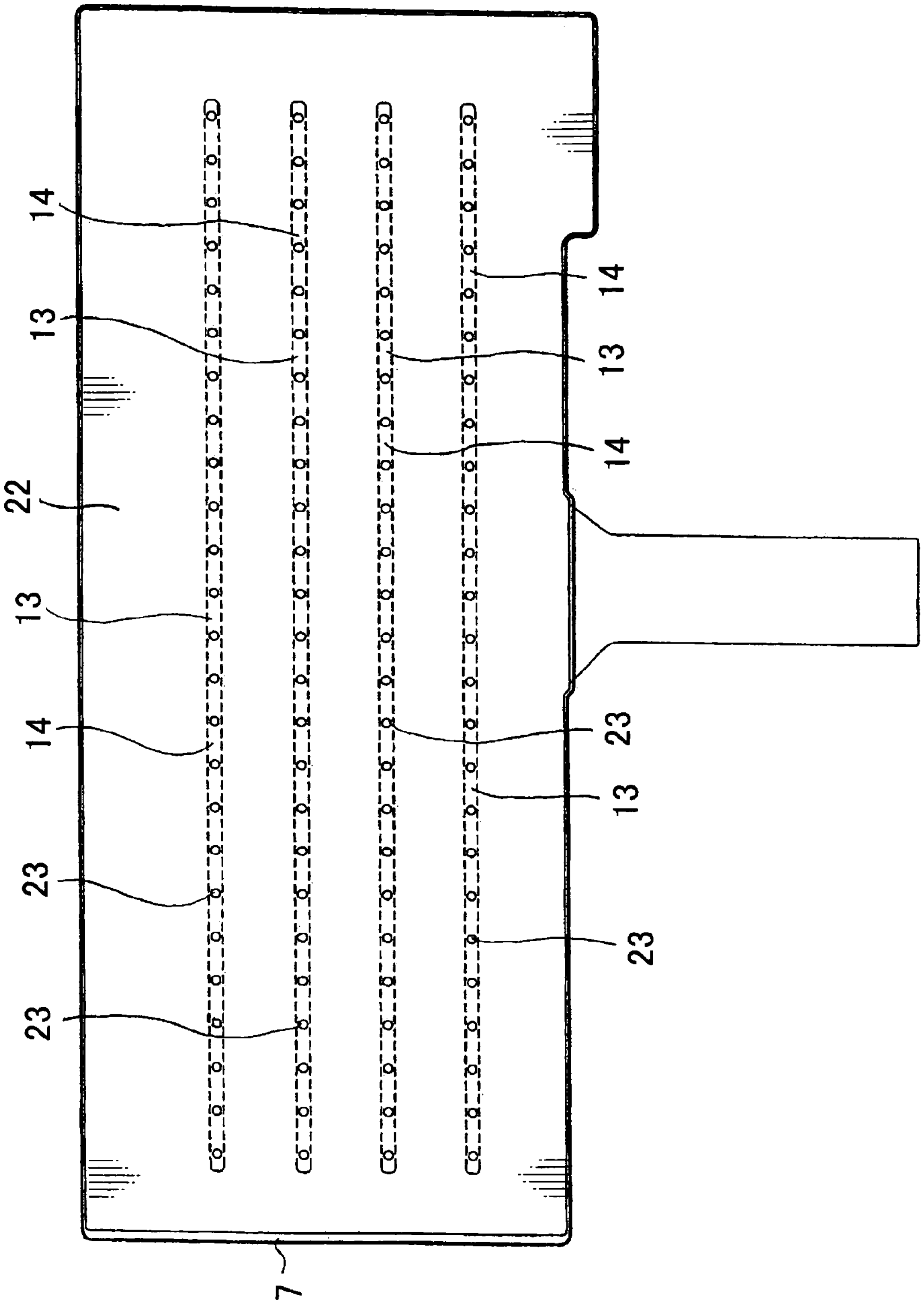
FIG. 5 is a plan view showing a reinforcing plate and a membrane sheet according to the second embodiment.

Next, a second embodiment of the invention is explained hereinafter. FIG. 4 is a cross sectional view showing the substantial portion of a keyboard apparatus according to the second embodiment, and FIG. 5 is a plan view showing a reinforcing plate and a membrane sheet according to the second embodiment. In FIG. 4, in a keyboard apparatus 21 according to the second embodiment, in the same manner as in the first embodiment, the embossed portion 12 is formed in the reinforcing plate 7, and an upper inside 13 of the embossed portion 12 is filled with the cooling agent 14.

A membrane sheet 22 is arranged on the upper surfaces of the reinforcing plate 7 and the cooling agent 14, and a heat dissipation hole 23 is formed at the position of the membrane sheet 22 opposing the cooling agent 14. The heat dissipation hole 23 is, as shown in FIG. 5, formed in plurality, and formed at a roughly same interval along the embossed portion 12. The heat dissipation hole 23 is so formed as to go through the membrane sheet 22, that is, to go through an upper sheet 22*a*, a spacer sheet 22*c* and a lower sheet 22*b* of the membrane sheet 22, and thus heat absorbed by the cooling agent 14 can easily dissipate to the above of the membrane sheet 22. The shape of the heat dissipation hole 23 may be formed arbitrarily. The example shown in the figure is circular, but the shape may be formed rectangular, and may be formed thin to meet the shape of the embossed portion 12.

As described above, in the second embodiment, since the heat dissipation hole 23 is arranged in the membrane sheet 22 above the cooling agent 14, when a heat source such as a CPU is arranged under the reinforcing plate 7, heat from the heat source is absorbed by the cooling agent 14 via the embossed portion 12 of the reinforcing plate 7, and further dissipated from the cooling agent 14 by the heat dissipation hole 23, thereby it is possible to improve the cooling effect further more than in the first embodiment.

Figure 6:
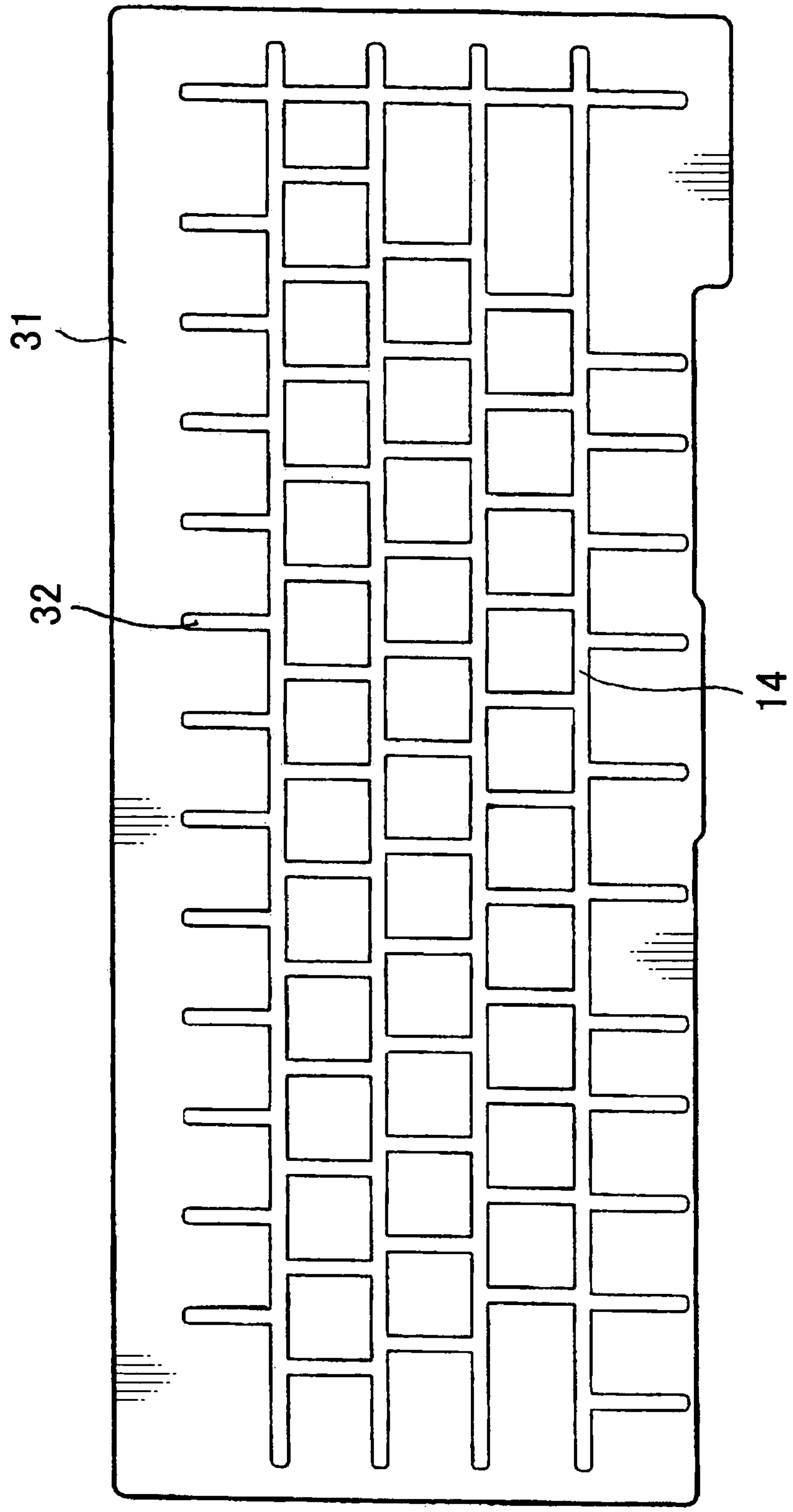
FIG. 6 is a plan view showing a reinforcing plate according to a third embodiment.

Next, a third embodiment of the invention is explained hereinafter. FIG. 6 is a plan view showing a reinforcing plate according to the third embodiment. In FIG. 6, in a reinforcing plate 31 according to the third embodiment, an embossed portion 32 is formed in a mesh shape between key switches to meet the arrangement of the key switches. The cooling agent 14 is filled into the embedded portion 32 of the mesh shape.

When the embossed portion 32 is formed in the reinforcing plate 31, a protruded portion is formed on the back side (undersurface) of the reinforcing plate 31. If parts packaged on the undersurface of the reinforcing plate 31 interfere with the protruded portion, the embossed portion 32 is not to be formed on such an interfering portion.

As described above, in the third embodiment, the embossed portion 32 may be formed vertically and horizontally to meet the arrangement of key switches so long as it does not interfere with packaged parts, thereby it is possible to maintain the thin structure of the keyboard apparatus, and also secure the highest strength thereof and attain the maximum cooling effect thereof.

In the embodiments described above, keyboard apparatuses to be used in notebook personal computers have been explained, however, the invention is not limited to the embodiments mentioned above, but may be applied to switches of various kinds of input devices.

Embodiments of the present invention are described above, but the present invention is not limited to the embodiment as will be clear to those skilled in the art.

Namely, a first aspect of the invention is a keyboard apparatus comprising a base component on which a plurality of key switches are arranged, and which has an embossed portion, wherein the inside of the embossed portion is filled with a cooling agent.

According to the first aspect of the invention, since an embossed portion is formed in a base component, it is possible to improve the strength, and further, the inside of the embossed portion is filled with a cooling agent, thereby it is possible to absorb heat from heat sources.

What is claimed is:

1. A keyboard apparatus comprising a base component on which a plurality of key switches are arranged, and which has an embossed portion, wherein the inside of the embossed portion is filled with a cooling agent; and a membrane sheet on the base component, the membrane sheet having contact point portions corresponding to the key switches, wherein the membrane sheet has a heat dissipation hole formed at a portion opposing the embossed portion.

2. The keyboard apparatus according to claim 1, wherein the embossed portion is formed continuously between the key switches along the length of key rows over substantially the entire length from the left end to the right end of the rows, and the cooling agent is filled so as to be continuous in the embossed portion.

3. The keyboard apparatus according to claim 2, wherein the embossed portion is formed with consideration according to parts arranged under the base component.

4. The keyboard apparatus according to claim 1, wherein a plurality of the heat dissipation holes is formed with a specified interval between holes.

5. A keyboard apparatus comprising:

a plurality of key switches;

a membrane sheet having a plurality of contact point portions corresponding to the key switches; and a base component arranged under the membrane sheet and on parts including at least a heat source, and having an embossed portion embossed between the key switches to protrude out on the opposite side of the base component to the key switches and filled with a cooling agent, wherein the membrane sheet has a heat dissipation hole formed at a portion opposing the embossed portion.

6. The keyboard apparatus according to claim 5, wherein the embossed portion is formed continuously along the length of key rows of the key switches over substantially the entire length from the left end to the right end of the rows, and the cooling agent is filled so as to be continuous in the embossed portion.

7. The keyboard apparatus according to claim 6, wherein the embossed portion is further formed continuously along the top to bottom direction of key rows of the key switches over substantially the entire range from the upper end to the lower end of the key rows, and formed with consideration according to the parts.

8. The keyboard apparatus according to claim 5, wherein a plurality of the heat dissipation holes is formed arranged with a specified interval between the holes.

* * * * *